Feb. 7, 1956
R. A. FRYKLUND
2,734,161
MOTOR SPEED CONTROL SYSTEM
Filed April 11, 1952
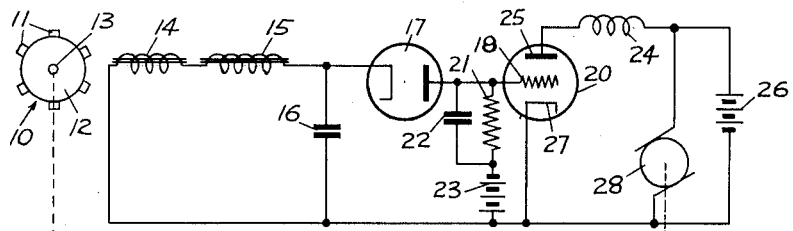
FIG. 1
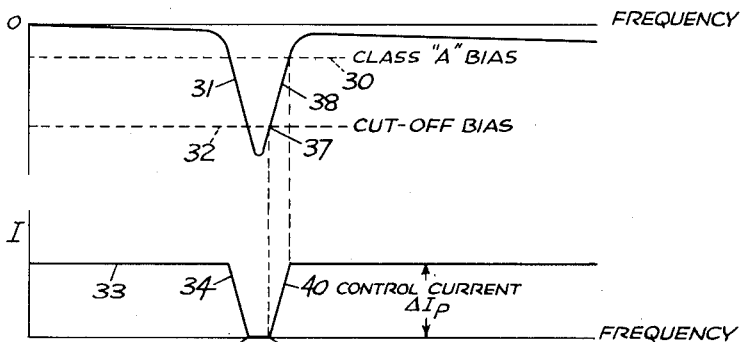
FIG. 2a
FIG. 2b
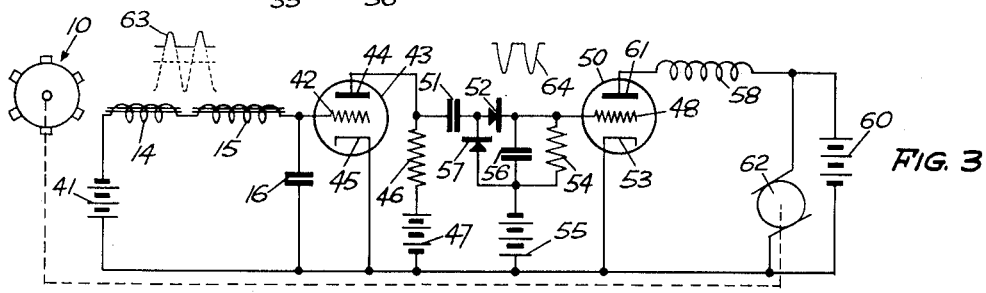
FIG. 3
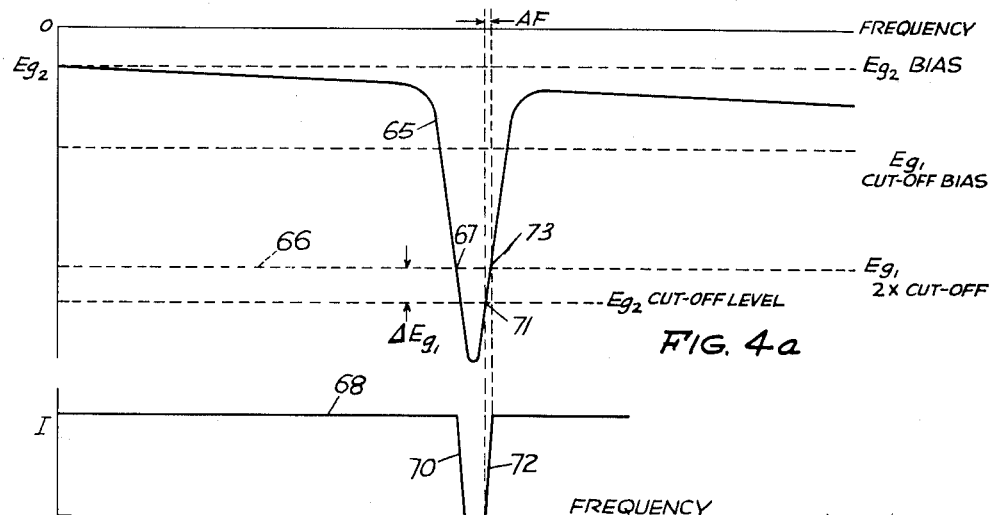
FIG. 4a
FIG. 4b
INVENTOR
ROBERT A. FRYKLUND
BY Elmer J. Gorn
ATTORNEY United States Patent Office 2,734,161
Patented Feb. 7, 1956

2,734,161

MOTOR SPEED CONTROL SYSTEM

Robert A. Fryklund, Dedham, Mass., assignor, by mesne assignments, to the United States of America as represented by the Secretary of the Navy Application April 11, 1952, Serial No. 281,867

2 Claims. (Cl. 318—328)

This invention relates to motor speed control circuits and, more particularly, to discriminator circuits for developing a signal dependent upon the speed of rotation of a shaft.

The circuits of this invention obtain rapid control by electronic means. An alternator or phonic wheel is driven by the motor, the speed of which is to be controlled. This alternator produces a voltage of a frequency determined by the speed of the motor. This output is passed through a circuit resonant at the frequency corresponding to a speed slightly below that at which the motor is to be maintained. As a result, a negative direct current voltage appears at the grid of a control tube that controls the current through one or more of the windings of the motor to be controlled so as to determine its speed. When the motor operates above the desired speed, there is only the initial fixed bias on the grid of the control tube and it conducts. When the motor slows down, because of an increasing load or for other reasons, the frequency produced by the alternator is reduced towards the resonant frequency of the tuned circuit. The resulting negative direct current potential at the grid of the control tube reduces the current flow through the control tube and the field winding with the result that the motor speeds up to the desired speed. In this manner the speed of the motor may be maintained within a very small range about the desired speed. This range can be reduced further by amplifying the output of the tuned circuit before rectification.

These and other features and advantages of the invention will become more apparent from the following description taken in connection with the accompanying drawings wherein:

Fig. 1 is a schematic diagram of the circuit of one embodiment of the invention;

Fig. 2a is a graph of the voltage output of the rectifier or discriminator circuit of Fig. 1 with respect to frequency;

Fig. 2b is a graph of the current flowing through the control tube of the circuit of Fig. 1 with respect to frequency;

Fig. 3 is a schematic diagram of the circuit of a second embodiment of the invention;

Fig. 4a is a graph of the voltage output of the rectifier or discriminator circuit of Fig. 3 with respect to frequency; and Fig. 4b is a graph of the current flowing through the control tube of the circuit Fig. 3 plotted with respect to frequency.

In Fig. 1, the reference numeral 10 refers to a phonic wheel comprising a plurality of magnetic poles 11 mounted on a disk 12 carried by a shaft 13 driven by the motor to be controlled. The magnetic poles 11 pass a pickup coil 14 and generate voltage impulses at a repetition rate dependent upon the number of such poles passing the pickup coil in a given time. This is determined by the number of poles mounted on the disk 12 and the speed of rotation of the shaft 13 which is, in turn, determined by the speed of the motor to be controlled. An alternator can be substituted for the phonic wheel shown. The pickup coil 14 is connected in a resonant circuit with a second inductance 15 and a capacitor 16. This circuit is resonant at a frequency corresponding to a speed of the motor somewhat less than that at which it is to be maintained. The voltage appearing across this resonant circuit is rectified by a rectifier 17 and applied to the grid 18 of a control tube 20 across a filter circuit comprising a resistor 21 shunted by a capacitor 22. This resonant circuit, rectifier, and filter constitute a frequency discriminator. A source 23 of negative potential is connected to the grid 18 through the resistor 21. The field winding 24 of a motor to be controlled is connected in series with the plate 25 of the control tube 20, a source 26 of positive potential, and the catode 27 of the tube 20. The armature winding 28 of the motor is connected across the source of positive potential 26.

In operation, when the motor starts the frequency of the output of the alternator increases. Due to the resonant circuit comprising the inductance 15 and the capacitor 16, the voltage across the capacitor 16 rises until the motor reaches a speed corresponding to the resonant frequency of the above-mentioned circuit. As the speed of the motor further increases, this voltage decreases. This voltage is rectified when it becomes greater than the fixed negative potential applied to the grid of the control tube. This potential is represented by the dotted line 30 in the graph of Fig. 2a. When the output of the alternator exceeds this negative bias it is rectified by the rectifier 17 and appears as a negative potential that varies with frequency, as shown by the solid curve 31 in the graph of Fig. 2a, where the frequency is plotted horizontally and the voltage vertically. This output voltage of the discriminator circuit is superimposed on the fixed negative bias from the source 23 to give the total bias on the grid 18. As this bias becomes increasingly negative with increasing speed of the motor, it will reach a point where it equals or exceeds the cutoff potential of the control tube, as represented by the dotted line 32. Until this point, the plate current has been flowing in the control tube 20, as shown by the curve 33 in the graph of Fig. 2b. As the bias increases along the curve 31, the plate current drops, as shown by the portion 34 of the curve of Fig. 2b, until at the cutoff potential, it reaches zero at the point 35. Current begins to flow again at the point 36 when the bias returns above the cutoff potential at the point 37 and rises along the line 38 to the fixed negative potential. At this point the rectifier ceases to conduct. This reduction of the negative bias results in the current increasing along the line 40 of the graph in Fig. 2b. It will be seen from Fig. 1 that the field winding 24 of the motor is in the plate circuit of the control tube and the current shown in the graph of Fig. 2b will flow through it. Thus, as the tube conducts, more current will flow through the field winding 24 in the shunt field type of motor shown. As the field current increases the speed will decrease. When the circuit is adjusted to permit the motor to operate at a speed represented by the region 40 of the graph in Fig. 2b, any decrease in speed will permit less current to flow in the control tube 20 and the field winding 24, which has the effect of speeding up the motor. If the motor speeds up beyond the desired speed, the control tube will conduct more current and more current will flow through the field winding reducing the speed of the motor. Thus, the motor will be maintained to within a small percentage of the desired speed.

By the use of an amplifier, as shown in Fig. 3, the motor may be held within a narrower range of the desired speed. As before, an alternator 10 generates in the resonant circuit comprising the pickup coil 14, a second inductance 15, and a capacitor 16, a voltage at a frequency proportional to the speed of the motor that is to be controlled. A source of negative potential 41 is connected in series with the resonant circuit to apply a bias of twice the cut-off potential of the tube together with the output of the resonant circuit to the grid 42 of a triode 43. The plate 44 of his triode is connected to the cathode 45 through a load resistor 46 and a source 47 of positive potential. The plate 44 is also coupled to the grid 48 of a control tube 50 through a capacitor 51 and a rectifier 52. The grid 48 of the triode 50 is connected to the cathode 53 of this tube through a resistor 54 and a source 55 of fixed negative potential. A capacitor 56 is connected in shunt across the resistor 54. A second rectifier 57 is connected from a point between the capacitor 51 and the rectifier 52 to the source 55. As before, the circuit is shown as used to control a motor. The motor field winding 58 is connected in series with a source 60 of positive potential between the plate 61 and the cathode 53 of the control tube 50. The field winding 62 is connected across the source 60 of positive potential.

In operation, a voltage is produced by the alternator 10 across the resonant circuit that varies in magnitude with the speed of the motor to be controlled with a peak at the resonant frequency of the tube circuit. Only the positive peaks of this signal are amplified by the tube 43, as seen by reference to the waveform 63 in Fig. 3. These signals appear as amplified negative pulses across the load resistor 46, as seen by reference to the waveform 64. The amplitude of these pulses varies with speed in the manner shown in the curve 65 of Fig. 4a. When the amplitude of these pulses exceeds the fixed negative bias on the grid 48 of the control tube 50, they are rectified by the rectifiers 52 and 57 connected in a voltage doubler circuit and appear as a negative D. C. potential at the grid 48 of the control tube 50 after filtering in the circuit comprising resistor 54 and capacitor 56. As the speed of the motor increases, the output of this discriminator circuit represented by the curves in Fig. 4a, exceeds the bias on tube 43 represented by the line 66 and it conducts. As the speed increases further, it reaches the cutoff potential of the control tube 50 represented by the line 68 and cuts off the control tube 50. During this period, the current through the control tube 50 has decreased from its steady state value represented by the curve 68 as represented by the line 70. As the frequency increases further, this discriminator output voltage again brings the grid 48 above cutoff at the point 71 and the control tube 50 begins to conduct again. The resulting current through the control grid 50 is shown by the curve 72 in Fig. 4b, which resembles the graph in Fig. 2b. As with the circuit of Fig. 1, when the control tube 50 conducts, more current flows through the field winding 58 and the speed of the motor is reduced. When the current flowing through the control tube 50 is reduced, the current flowing through the field winding 58 is also reduced and the motor speeds up. By reference to Fig. 4a, it will be seen that as the speed of the motor increases above the selected operating point, the signal generated by the discriminator circuit decreases and appears at the grid 48 of the control tube 50 as a decreasingly negative bias until the bias potential of the amplifier tube 43 is reached at point 73. This increases the current flowing through the field winding 58 and reduces the speed of the motor. When the speed of the motor is reduced below the operating point, the discriminator circuit produces an increasingly negative bias at the grid 48 of the control tube 50 and the tube conducts less, and less current flows through the field winding 58 increasing the speed of the motor.

It will be seen by a comparison of Figs. 2b and 4b that a lesser difference in speed represented by ΔF is required to produce a given difference in field current along the line 40 in the circuit of Fig. 3 than along the line 72 in the circuit of Fig. 1. Thus, the motor can be held closer to the selected speed with a circuit of Fig. 3 than with that of Fig. 1. With these circuits the speed can readily be held within one-half of one per cent. of the desired speed. The supply voltage can be varied over fourteen per cent. of its initial value and the speed will be held within two-tenths of one per cent. of the desired value by the use of the circuits of this invention.

Discriminator circuits of the type described may be used wherever it is desired to produce a voltage proportional to the speed of a rotating shaft whether for the described purpose of controlling the speed of a motor or for any other purpose.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a motor control circuit, a motor to be controlled, a phonic wheel mechanically connected to and driven by said motor, a pickup coil carried in close spaced adjacency to said wheel for generating voltage impulses at a repetition rate which is a function of the motor speed, a resonant circuit connected to the output side of said coil and having a resonant frequency corresponding to a motor speed less than the desired operating speed, a control triode tube, a rectifier serially connected between the grid of said control tube and the output side of said resonant circuit, a filter circuit connected between said rectifier and said control tube, a source of fixed negative potential connected via said filter circuit to the grid of said control tube for negatively biasing the grid, a source of positive potential, the field winding of said motor, the plate and cathode of said control tube and the source of positive potential being serially connected with one another, and the armature winding of said motor being connected across the source of positive potential whereby the control tube and field winding will conduct more current when the motor speed exceeds a predetermined value to decrease the motor speed and will conduct less current when the motor speed is less than the predetermined value to increase the motor speed.

2. In a motor control circuit, a motor to be controlled, a phonic wheel mechanically connected to and driven by said motor, a pickup coil carried in close spaced adjacency to said wheel for generating voltage impulses at a repetition rate which is a function of the motor speed, a triode electron discharge device having the grid thereof connected in series with said coil, a resonant circuit connected between the output side of said coil and said triode grid and having a resonant frequency corresponding to a motor speed less than the desired operating speed, a source of fixed negative potential connected in series with said resonant circuit to apply a fixed negative bias to the discharge device grid of twice the cutoff potential of the discharge device, a load resistor and a source of positive potential serially connected between the plate and cathode of said discharge device, a triode control tube having the grid thereof coupled in series to the plate of said discharge device, a capacitor and a rectifier serially connected between the plate of said discharge device and the grid of said control tube, a resistor and a second source of negative potential serially connecting the grid and cathode of the control tube, a capacitor shunt connected across said last-mentioned resistor, a second rectifier connecting a point between the capacitor and rectifier in the control tube grid circuit to said second source of negative potential, a second source of positive potential, the field winding of said motor being connected via said second source of positive potential between the plate and cathode of the control tube, and the armature winding of the motor being connected across said second source of positive potential.

(References on following page)

References Cited in the file of this patent

UNITED STATES PATENTS

| | | | |
|---|---|---|---|
| 1,448,902 | Shaeffer | Mar. 20, 1923 |
| 1,662,084 | Stroller et al. | Mar. 13, 1928 |
| 1,663,891 | Stroller et al. | Mar. 27, 1928 |
| 1,762,999 | Manderfield | June 10, 1930 |
| 2,021,753 | Suits | Nov. 19, 1935 |
| 2,254,899 | Laubenheimer et al. | Sept. 2, 1941 |
| 2,331,960 | Button | Oct. 19, 1943 |
| 2,442,213 | Ross | May 25, 1948 |
| 2,466,756 | White | Apr. 12, 1949 |
| 2,471,916 | Volz | May 31, 1949 |
| 2,496,730 | Linbeck et al. | Feb. 7, 1950 |